United States Patent
Whalen

(10) Patent No.: US 8,931,518 B2
(45) Date of Patent: Jan. 13, 2015

(54) SHAPING A FLUID CAVITY OF A FLOW CONTROL ACTUATOR FOR CREATION OF DESIRED WAVEFORM CHARACTERISTICS

(75) Inventor: Edward A. Whalen, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1291 days.

(21) Appl. No.: 12/236,032

(22) Filed: Sep. 23, 2008

(65) Prior Publication Data

US 2010/0071773 A1  Mar. 25, 2010

(51) Int. Cl.
*B64C 21/02* (2006.01)

(52) U.S. Cl.
CPC .............. *B64C 21/025* (2013.01); *Y02T 50/166* (2013.01); *B64C 2230/04* (2013.01); *B64C 2230/18* (2013.01)
USPC ........... 137/803; 244/99.8; 244/130; 244/208

(58) Field of Classification Search
CPC ..................... B64C 21/025; B64C 2700/6271; B64C 2230/04; B64C 2230/18; Y02T 50/166; Y02T 50/168
USPC .................. 137/803; 244/207–209, 130, 99.8
See application file for complete search history.

(56) References Cited

U.S. PATENT DOCUMENTS

| | | | |
|---|---|---|---|
| 5,515,684 A * | 5/1996 | Lucas et al. | 62/6 |
| 5,758,823 A * | 6/1998 | Glezer et al. | 239/4 |
| 5,894,990 A * | 4/1999 | Glezer et al. | 239/423 |
| 5,938,404 A * | 8/1999 | Domzalski et al. | 416/91 |
| 5,957,413 A * | 9/1999 | Glezer et al. | 244/208 |
| 6,056,204 A * | 5/2000 | Glezer et al. | 239/8 |
| 6,092,990 A * | 7/2000 | Hassan et al. | 416/42 |
| 6,123,145 A * | 9/2000 | Glezer et al. | 165/104.33 |
| 6,234,751 B1 * | 5/2001 | Hassan et al. | 416/42 |
| 6,412,732 B1 * | 7/2002 | Amitay et al. | 244/208 |
| 6,457,654 B1 * | 10/2002 | Glezer et al. | 239/4 |
| 6,543,719 B1 * | 4/2003 | Hassan et al. | 244/17.13 |
| 6,644,598 B2 * | 11/2003 | Glezer et al. | 244/208 |

OTHER PUBLICATIONS

Ilinskii, et al., Article entitled, "Nonlinear Standing Waves in an Acoustical Resonator," published in the Acoustical Society of America, Nov. 1998, pp. 2664-2674; 11 pages.

Lawrenson, et al., Article entitled, "Measurements of Macrosonic Standing Waves in Oscillating Closed Cavitiesa)," published in the Acoustical Society of America, Nov. 1998, pp. 623-636; 14 pages.

* cited by examiner

Primary Examiner — Craig Schneider
(74) Attorney, Agent, or Firm — Hope Baldauff LLC

(57) ABSTRACT

Apparatus and methods provide for a flow control actuator having a fluid cavity that is shaped to create periodic waveforms within the resulting resonant actuating flow with predetermined characteristics for actuating a high-speed fluid flow. According to various embodiments, a flow control actuator includes a power source for exciting the actuator fluid at a resonant frequency and a cavity shaped according to resonant macrosonic synthesis principles to maximize the exit velocity of the actuating flow at an orifice of the actuator.

3 Claims, 4 Drawing Sheets

SHAPING A FLUID CAVITY OF A FLOW CONTROL ACTUATOR FOR CREATION OF DESIRED WAVEFORM CHARACTERISTICS

BACKGROUND

Flow control actuators are utilized in various applications to augment or otherwise manipulate a fluid flow. One application in which flow control actuators are commonly utilized is in the aircraft industry, specifically to control various airflow fields around an aircraft in flight. A synthetic jet actuator is a type of flow control actuator that utilizes a diaphragm to push and pull an air mass within a cavity of the actuator. Doing so creates a synthetic jet of air through an orifice in the actuator to react with and modify an external airflow. The jet of air is "synthetic" because there is a zero-net mass flux through the actuator. Another type of flow control actuator includes a powered resonance tube (PRT). A PRT utilizes an external air source to force air within the actuator cavity to create the actuating flow, which subsequently interacts with and modifies the external airflow. A detonation driven actuator utilizes the combustion of a fuel injected into a combustion chamber to create combustion products that are exhausted into an external airflow in an effort to manipulate the airflow.

With each type of conventional flow control actuator, the effectiveness of the actuator typically decreases as the external flow to be manipulated increases in speed. With high-speed airflows, the jet velocities and associated actuator cavity pressures required to affect the high-speed airflow in a desired manner are quite large. This commonly requires external sources of fuel or high-pressure air to augment the air or other fluid within the actuator. The carriage of supplemental tanks or fuel sources increases the cost, footprint, and weight of the flow control actuator system, which is undesirable in an aircraft or other vehicle having space and weight limitations, as well as budgetary constraints.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for the utilization of a shaped cavity within a flow control actuator to provide for the efficient control of high-speed and other airflows. According to one aspect of the disclosure provided herein, a flow control actuator includes a power source, a shaped cavity, and an orifice. The power source excites fluid within the shaped cavity to create an actuating flow. The cavity is shaped to create a desired waveform in the actuating flow when the fluid is excited by the power source to a resonant frequency. The actuating flow that includes the desired waveform flows out of the orifice at the resonant frequency to interact with an external fluid flow. According to various implementations, the cavity is shaped according to resonant macrosonic synthesis principles to create high-magnitude pressure waves and maximize the exit velocity of the actuating flow exiting the orifice of the flow control actuator.

According to another aspect, a method of augmenting a fluid flow includes exciting an actuator fluid to a resonant frequency to create an actuating flow. To excite the actuator fluid, a power source such as a diaphragm, a shaker mechanism, and/or an externally supplied air stream is utilized to drive the actuator fluid within an actuator cavity that is shaped to produce a waveform having predetermined characteristics in the actuating flow at the resonant frequency. The actuating flow is then exposed to the fluid flow to augment or alter the fluid flow as desired.

According to yet another aspect, a method for controlling a fluid flow with a flow control actuator includes shaping a cavity of the flow control actuator according to the characteristics of an actuator fluid and a desired waveform utilizing resonant macrosonic synthesis principles. A power source for exciting the actuator fluid is configured. According to various implementations, the power source may be a diaphragm, a shaker mechanism, an external air source, or any combination thereof.

The features, functions, and advantages that have been discussed can be achieved independently in various embodiments of the present invention or may be combined in yet other embodiments, further details of which can be seen with reference to the following description and drawings.

DETAILED DESCRIPTION

Figure 1:
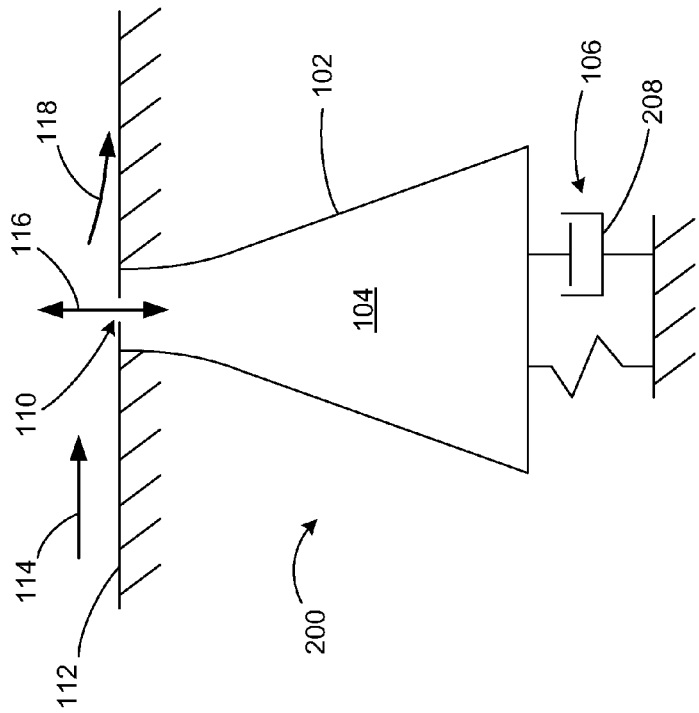
FIG. 1 is a diagram of a flow control actuator utilizing a diaphragm power source and a shaped cavity to control an external fluid flow according to various embodiments presented herein.

The following detailed description is directed to apparatus and methods for controlling fluid flow utilizing a flow control actuator with a shaped cavity. Flow control actuators are commonly used to control the flow of a fluid, or to affect the fluid flow in some predictable manner. With many conventional flow control actuators, a power source is used to excite a fluid within an actuator cavity. The excited fluid, or actuating flow, then exits the actuator cavity through an orifice, where it interacts with an external flow that is to be augmented or modified due to the interaction with the actuating flow. In an aircraft scenario, for example, a flow control actuator may be used to maintain the attachment point of airflow over the wings of the aircraft in order to avoid flow separation and to maintain lift.

As discussed briefly above, there are various type of flow control actuators. A synthetic jet actuator is a zero-net mass flux actuator, which indicates that the actuating flow from the actuator is created from the fluid within the actuator cavity rather than external air being supplied to the actuator in order to create the actuating flow. Typically, the power source that excites the actuator fluid within a synthetic jet actuator may include one or more diaphragms located at one or more ends of the actuator cavity. The diaphragm is oscillated or otherwise modulated according to a desired frequency to excite the actuator fluid within the cavity and create the actuating flow. Embodiments provided herein that utilize a diaphragm as a power source are described below with respect to FIGS. 1 and 3. Alternatively, the power source of a synthetic jet actuator may include a shaker mechanism. The shaker mechanism is any type of mechanical device that physically shakes the actuator cavity to excite the fluid within at a desired frequency. Embodiments provided herein that utilize a shaker mechanism as a power source are described below with respect to FIGS. 2 and 4.

Another type of flow control actuator to be discussed below with respect to the embodiments disclosed herein is a PRT. A PRT is a positive-net mass flux actuator in that it utilizes an external air source to force air within the actuator cavity to create the actuating flow. It should be understood that although the disclosure provided herein illustrates the various embodiments with respect to diaphragm-driven actuators and shaker-driven actuators, as well as a combination of synthetic jet actuators and PRTs, the concepts presented herein are equally applicable to any type of flow control actuator that utilizes a fluid cavity and would benefit from maximizing the amplitude of resonant frequency actuating fluid flow.

As discussed briefly above, typical flow control actuators cannot be used to adequately control high-speed flows without the use of high-pressure external air or the combustion of fuel within a combustion chamber. For the purposes of this disclosure, the term "high-speed flow" may relate to high subsonic, transonic, and supersonic flows. To create an actuating flow that can be used to control a high-speed external flow, such as a supersonic flow over an aircraft surface, a very large mass of air must be pushed into an actuator cavity. It should be appreciated that although embodiments are described throughout this disclosure with respect to controlling high-speed airflow, the concepts discussed herein may also be used to manipulate any airflow of any velocity.

Creating a large mass of air to be forced into the actuator cavity typically requires the use of large tanks to hold the high-pressure air, as well as the associated plumbing to deliver the air. Detonation-driven actuators may also be used to create the mass of air, but requires the storage of fuel. Alternatively, high-pressure air could be bled from jet engines on an aircraft, which then requires plumbing to deliver the high-pressure air to the actuators. Storing fuel, air or any other type of fluid for used within a flow control actuator is costly, takes valuable space when used in an aircraft or other vehicle application, and adds undesirable weight, which can decrease aircraft performance. Bleeding high-pressure air from jet engines degrades their performance and requires plumbing that again adds undesirable weight to the aircraft.

Utilizing the concepts and technologies described herein, a flow control actuator may be configured so that the fluid cavity is shaped to allow the fluid being excited by a power source to flow at a resonant frequency and exit the actuator with higher-magnitude pressure waves than can be achieved by conventional flow control actuators. Resonant macrosonic synthesis concepts, as discussed in greater detail below, are used to define the shape of the actuator cavity in order to maximize the amplitude of the pressure waves of the actuating flow as they exit the actuator at resonant frequencies. By applying the concepts described below, the effectiveness of an actuating flow can be increased as compared to a conventional flow control actuator. This eliminates or decreases the quantity of external air, fuel, or other fluid required to augment the actuating flow to provide a cost, space, and weight savings over conventional flow control systems.

Throughout this disclosure, embodiments are described with respect to flow control actuators that are utilized to control airflow over an aircraft surface. An aircraft environment provides a useful example for embodiments described herein since the ability to control airflow over an aircraft surface has considerable impact on the performance of the aircraft or an aircraft system. However, it should be understood that the concepts presented herein are equally applicable to any type of fluid flow as applied to any type of platform, including ships, vehicles, or any other platform in which controlling a fluid flow is desirable.

In the following detailed description, references are made to the accompanying drawings that form a part hereof, and which are shown by way of illustration, specific embodiments, or examples. Referring now to the drawings, in which like numerals represent like elements through the several figures, flow control actuators according to the various embodiments will be described. FIG. 1 shows a flow control actuator 100 according to one embodiment. The flow control actuator 100 represents an example of a synthetic jet actuator utilizing the concepts described herein. The flow control actuator 100 includes a shaped cavity 102, a power source 106, and an orifice 110. The shaped cavity 102 contains the actuator fluid 104 that will be driven as an actuating flow 116 into the external fluid flow 114 to produce the modified fluid flow 118.

Conventional flow control actuators include cavities that are often cylindrical shaped. Conventional cavities are not shaped to amplify or otherwise shape the waveforms associated with the actuating flow harmonics. In contrast, according to the embodiments presented herein, the shaped cavity 102 is specifically shaped to enhance the effectiveness of the flow control actuator 100 by increasing the magnitude of pressure waves exiting the shaped cavity 102. To do so, resonant macrosonic synthesis principles may be applied to create a shaped cavity 102 that is optimally configured for enhancing the waveforms of the actuating flow 116. Resonant macrosonic synthesis describes the concept of shaping a resonant acoustic waveform to a desired result using the geometry of the cavity that contains the waveform. Resonant macrosonic synthesis principles are described in detail in U.S. Pat. No. 5,515,684, which is herein incorporated by reference in its entirety.

The geometry of the shaped cavity 102 is determined according to resonant macrosonic synthesis principles to produce the desired high-amplitude waveforms that are not present in conventional flow control actuators. Although the geometry of the shaped cavities 102 of the actuators shown in FIGS. 1-4 is shown to be a conical shape for simplicity, it should be appreciated that the geometry of a shaped cavity 102 may be cylindrical, spherical, toroidal, conical, horn-shaped, bulb-shaped, any combination thereof, or any other geometry according to resonant macrosonic synthesis principles. The geometry of the shaped cavity 102 will depend on the desired characteristics of the actuating flow 116, among other criteria. The boundary conditions of the inside surface of the shaped cavity 102 may be controlled by the geometry of the shaped cavity 102 to achieve the desired waveform characteristics associated with the actuating flow 116. Moreover, in determining the geometry of the shaped cavity 102, the acoustical characteristics of the shaped cavity 102 material and of the actuator fluid 104 are factors that must be considered when applying resonant macrosonic synthesis principles.

Figure 6:
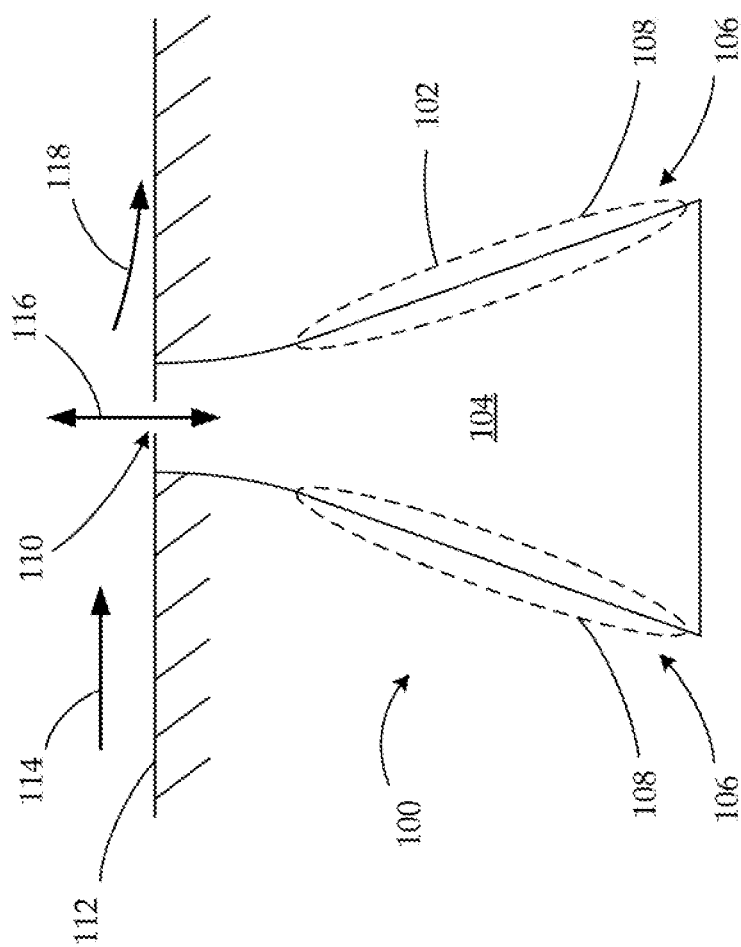
FIG. 6 is a diagram of an alternative flow control actuator utilizing two diaphragms as a power source and shaped cavity to control an external fluid flow according to various embodiments presented herin.

Looking at FIG. 1, the flow control actuator 100 includes a power source 106. According to this embodiment, the power source 106 is a diaphragm 108 attached to the flow control actuator 100 at the end of the shaped cavity 102 opposite the orifice 110. It should be appreciated that the flow control actuator 100 may include more than one diaphragm and is not limited to the configuration shown in FIG. 1. For example, the flow control actuator 100 may include two diaphragms 108 located on opposing ends of the shaped cavity 102, with the orifice 110 located at approximately a midpoint between the two diaphragms 108 as shown in FIG. 6.

In practice, the flow control actuator 100 may be positioned such that the orifice 110 is located on the surface 112 of a structure adjacent to the external fluid flow 114 to be controlled. The external fluid flow 114 interacts with the actuating flow 116 issuing from the orifice 110 to create a controlled flow 118. For example, the flow control actuator 100 of FIG. 1 may be installed beneath the surface 112 of an aircraft wing at a location selected to control the separation of an airflow, or external fluid flow 114, from the surface 112 of the wing. The airflow interacts with the actuating flow 116 from the orifice 110 and is manipulated downward toward the surface 112 of the wing as a result, preventing separation and maintaining lift. Because the shaped cavity 102 is specifically designed utilizing resonant macrosonic synthesis principles to create a waveform with a very high peak pressure when exiting the orifice 110, the flow control actuator 100 may be used to control high-speed airflows without the use of externally supplied air or fuel.

Figure 2:
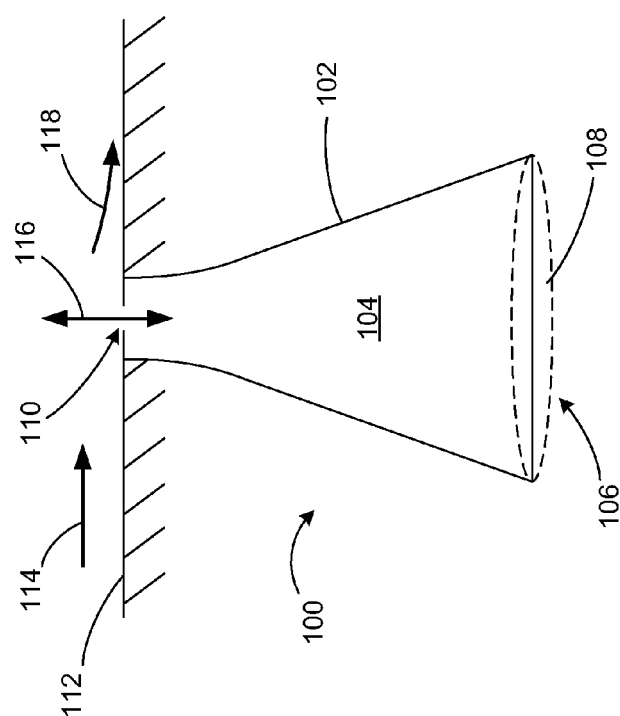
FIG. 2 is a diagram of a flow control actuator utilizing a shaker mechanism power source and a shaped cavity to control an external fluid flow according to various embodiments presented herein.
Figure 3:
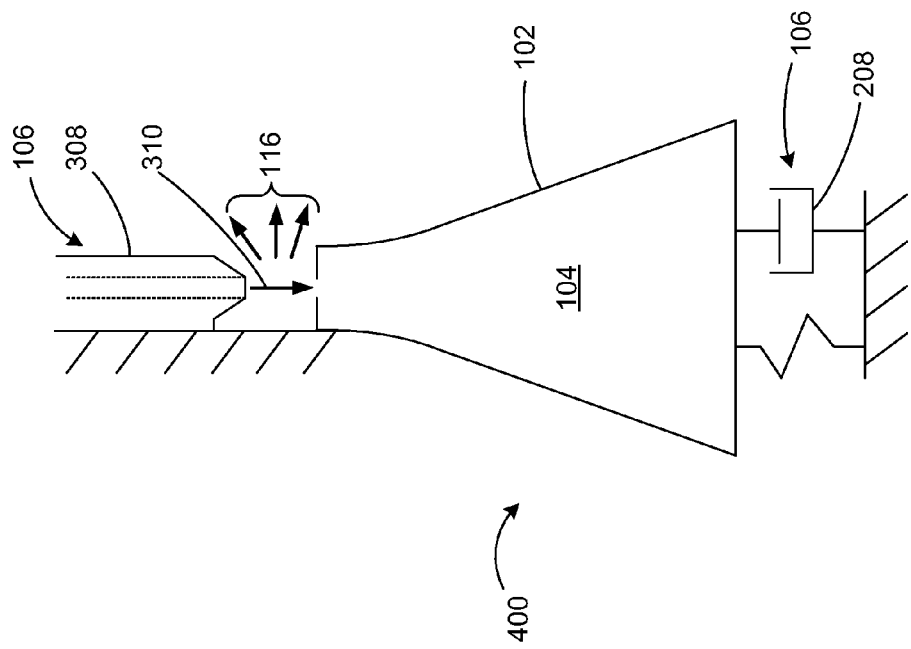
FIG. 3 is a diagram of a flow control actuator utilizing an external air supply and a diaphragm as power sources, coupled with a shaped cavity, to control an external fluid flow according to various embodiments presented herein.
Figure 4:
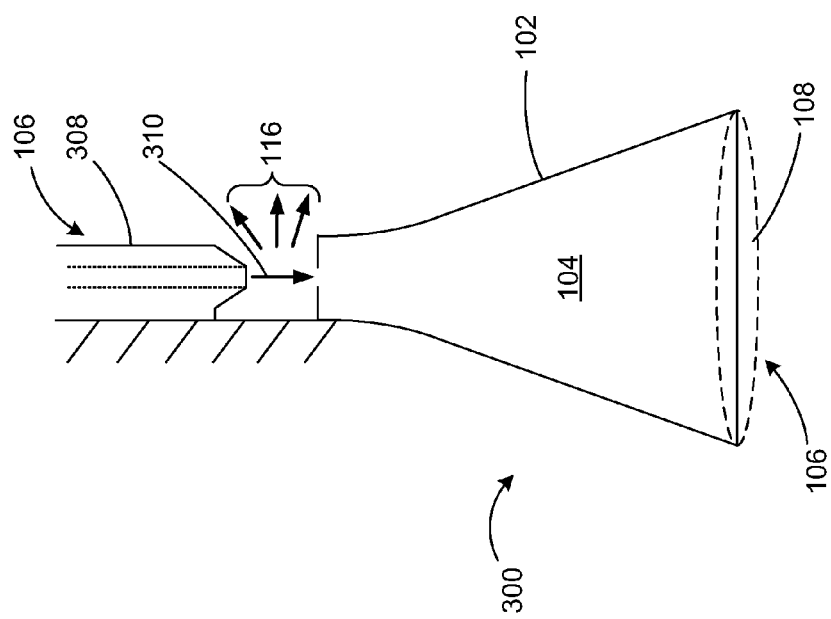
FIG. 4 is a diagram of a flow control actuator utilizing an external air supply and a shaker mechanism as power sources, coupled with a shaped cavity, to control an external fluid flow according to various embodiments presented herein.

FIG. 2 shows a flow control actuator 200 that utilizes a shaker mechanism 208 as the power source 106 for driving the actuator fluid 104 to create the actuating flow 116. As discussed above, the shaker mechanism 208 may include any type of mechanical device that functions to physically shake the shaped cavity 102 at a resonant frequency of the shaped cavity 102 to create the actuating flow 116. FIGS. 3 and 4 show flow control actuators 300 and 400, respectively, which utilize a shaped cavity 102 according to resonant macrosonic synthesis principles in conjunction with a PRT configuration in order to create the desired waveforms within the resonant flow 116.

In FIG. 3, the flow control actuator 300 includes a diaphragm 108 and an external air supply 308 as the power sources 106. It should be appreciated that the power source 106 may alternatively be the external air supply 308 alone, without any additional synthetic power source such as the diaphragm 108 shown in FIG. 3 or the shaker mechanism 208 shown in FIG. 4. The external air source 308 injects high-pressure air 310 into the shaped cavity 102 to aid in exciting the actuator fluid 104. The combined fluids are excited to a resonant frequency to create waveforms in the actuating flow 116 that have the desired characteristics (i.e., pressure and amplitude) according to the geometry of the shaped cavity 102. The flow control actuator 400 of FIG. 4 operates similarly to the flow control actuator 300, only utilizing a shaker mechanism 208 as a power source 106 rather than the diaphragm 108.

Figure 5:
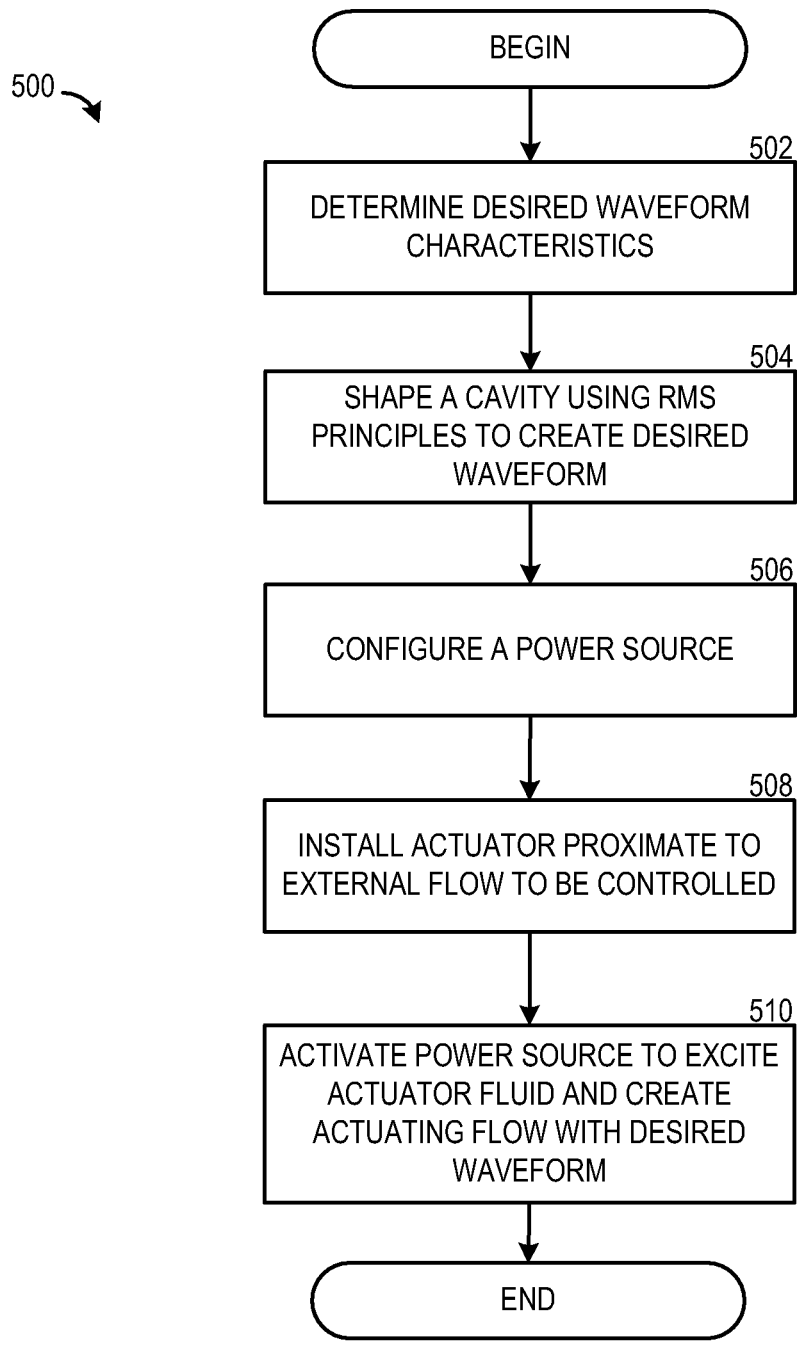
FIG. 5 is a flow diagram illustrating a method for controlling a fluid flow according to various embodiments presented herein.

Turning now to FIG. 5, an illustrative routine 500 for controlling an external fluid flow 114 with a flow control actuator 100 having a shaped cavity 102 will now be described in detail. The routine 500 will be described with respect to the flow control actuator 100 shown in FIG. 1, but is applicable to any type of flow control actuator that is functional to excite a fluid within a cavity. The routine 500 represents a simplified process for controlling a given external fluid flow 114 from design considerations for a flow control actuator 100 to operation of the flow control actuator 100. It should be appreciated that more or fewer operations may be performed than shown in the figures and described herein. These operations may also be performed in a different order than those described herein.

The routine 500 begins at operation 502, where the characteristics of a desired waveform within an actuating flow 116 are determined. For example, the flow control actuator 100 may be designed to control a supersonic flow at specific flight conditions. Using known engineering techniques, characteristics such as pressure and amplitude of a desired waveform may be determined that will allow the resonating predetermined waveforms within the actuating flow 116 to affect the supersonic flow in a desired manner at the specific flight conditions. Once the desired waveform characteristics have been determined, then the geometry of the shaped cavity 102 can be determined at operation 504.

As discussed above, the geometry of the shaped cavity 102 is determined using resonant macrosonic synthesis principles. This may include considering not only the desired waveform characteristics, but also acoustical properties of the actuator fluid 104, properties of one or more materials to be used in creating the shaped cavity 102, and any application constraints such as space constraints within the wing. The flow of the actuator fluid 104 within the shaped cavity 102 may be modeled using optimization algorithms to maximize the peak pressure observed at the orifice 110, or to otherwise obtain the desired waveform characteristics.

From operation 504, the routine 500 continues to operation 506, where the power source 106 is selected and configured according to the specific application and desired waveform characteristics to be achieved. A particular external fluid flow 114, shaped cavity 102 geometry, and actuator fluid 104 may require a PRT to drive the actuating flow 116 at the resonant frequency, while other embodiments may allow for a diaphragm 108, shaker mechanism 208, or other synthetic jet-type driver to power the flow control actuator 100. Once the power source 106 has been connected to the flow control actuator 100, the actuator is installed within the surface 112 of the applicable structure at operation 508.

At operation 510, the flow control actuator 100 is subjected to the external fluid flow 114 and the power source 106 is activated to drive the actuator fluid 104 at the resonant frequency of the fluid to create the actuating flow 116 at the orifice 110. The actuating flow 116 includes the desired waveform characteristics due to the chosen geometry of the shaped cavity 102. As a result, the flow control actuator 100 is capable of affecting the external fluid flow 114 in a more efficient manner than conventional flow control actuators to create the controlled flow 118. After creating the desired waveform within the actuating flow 116 at operation 510, the routine 500 ends.

Based on the foregoing, it should be appreciated that technologies for creating and utilizing a flow control actuator having a shaped cavity for controlling high speed and other external fluid flows are provided herein. Utilizing the embodiments described herein, high-speed airflows can be controlled in an energy efficient manner, without the use (or with minimal use) of large, heavy, costly tanks of high-pressured air or other fuel and the corresponding plumbing.

Flow control actuators according to the embodiments described above are useful in any number of high-speed airflow applications. For example, flow control actuators with cavities shaped using resonant macrosonic synthesis principles may be used to eliminate or mitigate the unsteady periodic acoustical characteristics that are present when releasing aircraft stores in supersonic flight conditions. By placing flow control actuators with shaped cavities at strategic locations proximate to the stores release area, an actuating flow 116 may be created that prevents the undesirable acoustical waveforms from forming.

A similar application for flow control actuators created with shaped cavities according to the disclosure above includes mitigation and control of shock waves. These flow control actuators may be used to distribute a well-defined shock wave so as to mitigate the power and strength of the wave and the corresponding sonic boom experienced as the wave passes a fixed point on the ground. It should be appreciated that the potential applications for flow control actuators having cavities shaped using resonant macrosonic synthesis principles are not limited to any specific application described in this disclosure. Rather the concepts and technologies described herein may be applied to any flow control actuator in which it is desirable to create a particular waveform characteristic in the resulting actuating flow from the cavity of the actuator.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A flow control actuator for augmenting an external high-speed fluid flow, the actuator comprising:
    a power source operative to excite fluid within the actuator to create an actuating flow;
    a cavity configured to contain the fluid within the actuator and shaped according to resonant macrosonic synthesis principles to create a predetermined waveform in the actuating flow when excited by the power source to a resonant frequency that comprises an amplitude at an exit end of the cavity that is sufficient to control the external high-speed fluid flow; and
    an orifice positioned at the exit end of the actuator between the external high-speed fluid flow and the cavity such that the actuating flow comprising the predetermined waveform and amplitude issues from the orifice to the external high-speed fluid flow at the resonant frequency when excited by the power source,
    wherein the power source comprises two diaphragms located on opposing ends of the cavity, and wherein the orifice is positioned at approximately a midpoint between the two diaphragms.

2. A method of augmenting a high-speed fluid flow with a flow control actuator, the method comprising:
    exciting an actuator fluid within the flow control actuator to a resonant frequency to create an actuating flow by oscillating two diaphragms located on opposing ends of an actuator cavity shaped according to resonant macrosonic synthesis principles to maximize an amplitude of a waveform of the actuating flow at an orifice of the flow control actuator to a magnitude sufficient to control the external high-speed fluid flow when the actuator fluid is excited by the power source to the resonant frequency; and
    exposing the actuating flow to the high-speed fluid flow to alter the fluid flow.

3. A method for controlling a high-speed fluid flow with a flow control actuator, the method comprising:
    shaping a cavity of the flow control actuator according to characteristics of an actuator fluid and a desired waveform utilizing resonant macrosonic synthesis principles such that exciting the actuator fluid within the cavity to a resonant frequency with a power source will create the desired waveform in an actuating flow of the actuator fluid that comprises an amplitude at an exit end of the cavity that is sufficient to control the external high-speed fluid flow;
    providing a pair of diaphragms positioned on opposing sides of the cavity and in contact with the actuator fluid within the cavity such that exciting the actuator fluid within the cavity comprises oscillating the pair of diaphragms to excite the actuator fluid; and
    providing an orifice at one end of the cavity at approximately a midpoint between the pair of diaphragms and in contact with the high-speed fluid flow to be controlled such that the actuating flow issues from the cavity to interact with the high-speed fluid flow.

\* \* \* \* \*